US007292366B2

(12) United States Patent
Fujimoto

(10) Patent No.: US 7,292,366 B2
(45) Date of Patent: Nov. 6, 2007

(54) PRINTING CONTROL SYSTEM, PRINTING CONTROL METHOD AND PROGRAM

(75) Inventor: Toshiro Fujimoto, Nakakoma-gun (JP)

(73) Assignee: Nisca Corporation, Yamanashi-ken (JP)

( * ) Notice: Subject to any disclaimer, the term of this patent is extended or adjusted under 35 U.S.C. 154(b) by 936 days.

(21) Appl. No.: 10/393,351

(22) Filed: Mar. 21, 2003

(65) Prior Publication Data
US 2004/0080784 A1 Apr. 29, 2004

(30) Foreign Application Priority Data
Mar. 22, 2002 (JP) ............................ 2002-080458
Mar. 18, 2003 (JP) ............................ 2003-073156

(51) Int. Cl.
*G06F 15/00* (2006.01)
(52) U.S. Cl. ..................... 358/1.18; 358/1.15; 358/1.9; 358/1.2
(58) Field of Classification Search .............. 358/1.18, 358/1.15, 1.9, 1.2
See application file for complete search history.

(56) References Cited

U.S. PATENT DOCUMENTS

| 4,778,288 | A | * | 10/1988 | Nakamura | ..................... | 400/76 |
| 4,899,227 | A | * | 2/1990 | Yamada | ....................... | 358/452 |
| 5,410,642 | A | * | 4/1995 | Hakamatsuka et al. | .... | 358/1.14 |
| 6,163,784 | A | * | 12/2000 | Taguchi | ....................... | 715/527 |
| 6,185,684 | B1 | * | 2/2001 | Pravetz et al. | ............... | 713/182 |
| 6,580,521 | B1 | * | 6/2003 | Nishikawa et al. | ........ | 358/1.18 |
| 6,674,542 | B1 | * | 1/2004 | Shimamura | ................. | 358/1.18 |
| 6,947,158 | B1 | * | 9/2005 | Kitamura et al. | ........... | 358/1.15 |
| 7,124,359 | B2 | * | 10/2006 | Suzuki et al. | ................ | 715/517 |
| 7,142,327 | B2 | * | 11/2006 | Kujirai | ....................... | 358/1.18 |

OTHER PUBLICATIONS

Hajime Nishizawa, Patent Abstracts of Japan, Publication No. 10-287016, Publication Date: Oct. 27, 1998.
Toru Hatori, Patent Abstracts of Japan, Publication No. 11-254778, Publication Date: Sep. 21, 1999.
Hajime Isono, Patent Abstracts of Japan, Publication No. 11-277835, Publication Date: Oct. 12, 1999.

* cited by examiner

*Primary Examiner*—Twyler Lamb
*Assistant Examiner*—Jacky X. Zheng
(74) *Attorney, Agent, or Firm*—Roberts, Mlotkowski & Hobbes; Thomas W. Cole

(57) ABSTRACT

A printing control system where poor printing does not occur on a recording medium is provided. A printing system 1 is constituted by connecting a printing apparatus 2 and a personal computer 3 by a connecting cable 4 of 100 base T. Determination is made as to whether disposition of information data to be disposed to an IC card C serving as a recording medium is appropriate based upon disposition position information of the information data to be disposed to the IC card C and inherent attribute information which is set depending on a type of the information data. On the basis of this determination result, printing processing for information data is controlled. Poor printing to the IC card C is prevented beforehand.

13 Claims, 13 Drawing Sheets

PRINTING CONTROL SYSTEM, PRINTING CONTROL METHOD AND PROGRAM

BACKGROUND OF THE INVENTION

1. Field of the Invention

The present invention relates to a printing control system, a printing control method and a program, and in particular relates to a printing control system and a printing control method that controls printing processing of information data to such a recording medium as a card or the like, and a program for information layout that performs layout of information data to a recording medium.

2. Description of Related Art

On a surface side of such a recording medium as an ID card, an IC card or the like, a face photograph and a name of an owner of the recording medium as well as information about the owner such as an ID or the like are printed. Because a whole surface printing is carried out on the surface side of the recording medium generally, after an image to be printed on the recording medium is transferred to an intermediate transfer medium, this image is re-transferred onto the recording medium by an in direct transferring system. Since a printing apparatus of the indirect transferring system has a dispersion or deviation (position error) in positioning accuracy to the recording medium, an image having a size slightly larger than that to be printed on the recording medium is transferred to the intermediate transfer medium.

For this reason, in order to perform layout of the image to be printed on the recording medium, as shown in FIG. 19, an object (information data) is conventionally disposed within a frame 72 having a margin including a position error at a time of printing to the recording medium. However, when a margin is given in view of the position error at the time of printing, there is such a problem that, since it is necessary to process an background image within the margin too, a blank may occur at an edge portion of the recording medium once the position error occurs.

In order to solve this problem, a technique for eliminating a substantial blank by adding a predetermined pixel number of pseudo pixels to at least a portion of an original image region periphery of original image data so as to enlarge the original image region, has been known (e.g., JPA-11-277835). Incidentally, relating to the present invention, a technique for moving a layout position of printing data according to a size of a print sheet (e.g., JPA-10-287016) and a technique for conducting a recovery so as a position of a staple not to overlap with printing data (e.g., JPA-11-254778) have been known.

However, among objects to be printed on the recording medium, there is an object which does not cause any problem even if the object lacks partially such as a background image, while there is an object which loses its meaning if the object lacks partially such as a name or a barcode. In case that layout of an image including such an object as losing its meaning if it lacks partially is performed to a recording medium, particularly when the object has a disposition area having a size wider than a region to be printed on a recording medium in whole surface printing, if the object is disposed at a border limit of the disposition region, an edge or border portion of the object lacks at a time of printing, which results in poor printing.

Further, in a card having IC contacts, since an image can not be formed on the IC contacts, when an object is disposed without taking the IC contacts into consideration, there are such drawbacks in that a lack occurs in the object at a time of printing and that a function of the IC card is affected.

SUMMARY OF THE INVENTION

In view of the above circumstances, an object of the present invention is to provide a printing control system, a printing control method, and a program for information layout, which do not cause poor printing on a recording medium.

In order to achieve the above object, a first aspect of the present invention provides a printing control system that has a main body apparatus for producing information data and a printing apparatus for printing the information data on a recording medium, and that controls printing processing of the information data, comprising: a setting unit which sets attribute information inherent to the information data; a layout unit which sets disposition of the information data to the recording medium in order to print the information data on the recording medium; a determining unit which determines about whether disposition of the information data to the recording medium is appropriate based upon disposition position information of the information data to be positioned by the layout unit and the attribute information set by the setting unit; and a control unit which controls printing processing of the information data on the basis of a determination result obtained by the determining unit.

In the first aspect, an information displaying unit which displays the determination result obtained by the determining unit may be further provided, where the control unit allows printing processing of the information data when a determination by the determining unit is made that the disposition of the information data to the recording medium is appropriate, and allows the information displaying unit to display disposition inappropriateness information of the information data when a determination by the determining unit is made that the disposition of the information data to the recording medium is inappropriate. According to this aspect, since appropriateness about the disposition position information can be determined for each information data and when a determination is made that the disposition of information data is inappropriate, the disposition inappropriateness information of the information data is displayed, which calls an attention in advance to a user who is to perform printing processing on the recording medium so that poor printing to the recording medium can be prevented beforehand.

Here, in case that the attribute information includes lack allowance rank information expressing an allowance degree to a lack which occurs at least at a portion of the information data due to that the information data overflows from the recording medium at a time of printing processing to the recording medium conducted by the printing apparatus, and that rank information which does not allow the lack is set in the information data by the setting unit, when the disposition position of the information data positioned by the layout unit is disposed at a position where the lack occurs in the information data to the recording medium, the determining unit may determine that the disposition of the information data is inappropriate. Further, in case that the attribute information includes overlap allowance rank information expressing an allowance degree to an overlap of the information data with different other information data at a time of printing processing to the recording medium conducted by the printing apparatus, and that rank information which does not allow the overlap is set in the information data by the setting unit, when the disposition position of the information data positioned by the layout unit overlaps with a position of other different information data, the determining unit may determine that the disposition of the information data is inappropriate. Furthermore, in case that the attribute information includes printing prohibition region setting information expressing a printing prohibition region for prohibiting printing processing at a time of printing processing to the recording medium conducted by the printing apparatus, and that the printing prohibition region setting information is set by the setting unit, when the disposition position of the information data positioned by the layout unit is located within the printing prohibition region, the determining unit may determine that the disposition of the information data is inappropriate.

Further, in order to achieve the above object, a second aspect of the present invention provides a printing control system that has a main body apparatus for producing information data and a printing apparatus for printing the information data on a recording medium, and that controls printing processing of the information data, comprising: a position control data holding unit which previously holds position control data expressing a printing position deviation amount that the printing apparatus has inherently when the printing apparatus prints the information data on the recording medium; a layout unit which sets disposition of the information data to the recording medium in order to print the information data on the recording medium; a determining unit which compares disposition position information of the information data to be positioned by the layout unit and the position control data held by the position control data holding unit to determine about whether the disposition of the information data to the recording medium is appropriate; and a control unit which controls printing processing of the information data on the basis of a determination result obtained by the determining unit.

In the second aspect, an information displaying unit which displays the determination result obtained by the determining unit may be further provided, where the control unit allows printing processing of the information data when a determination by the determining unit is made that the disposition of the information data to the recording medium is appropriate, and allows the information displaying unit to display disposition inappropriateness information of the information data when a determination by the determining unit is made that the disposition of the information data to the recording medium is inappropriate. In this aspect, since a determination is made about whether the disposition of the information data to the recording medium is appropriate by comparing the disposition position information of the information data to be positioned by the layout unit and the position control data held by the position control data holding unit, appropriateness about the disposition position information can be determined for each information data, and since a print securing region where the disposition of the information data to the recording medium is determined to be appropriate is set according to position control data expressing a print position deviation amount which the printing apparatus has inherently, a wider print securing region can be obtained as compared with a case that a print securing region is uniformly defined. Furthermore, when a determination is made that the disposition of the information data is inappropriate, the disposition inappropriateness information of the information data is displayed, which calls an attention in advance to a user who is to perform printing processing on the printing medium so that poor printing to the recording medium can be prevented beforehand.

A third aspect of the present invention provides a printing control method that controls printing of at least one or more information data to a recording medium, comprising: a step of setting attribute information inherent to the information data; a step of setting disposition of the information data to the recording medium in order to print the information data on the recording medium; a step of determining about whether disposition of the information data to the recording medium is appropriate based upon disposition position information of the information data and the attribute information; and a step of controlling printing processing of the information data so as to allow the printing processing when a determination in the determining step is made that the disposition of the information data to the recording medium is appropriate, and so as to prohibit the printing processing when a determination in the determining step is made that the disposition of the information data to the recording medium is inappropriate.

In this case, in the controlling step, the printing processing may be controlled so as to limit movement of the disposition position of the information data when a determination in the determining step is made that the disposition of the information data to the recording medium is appropriate, or, the printing processing may be controlled so as to adjust the disposition position of the information data when a determination in the determining step is made that the disposition of the information data to the recording medium is inappropriate. According to this aspect, since appropriateness about the disposition position information can be determined for each information data, and the printing processing is controlled so as to prohibit the printing processing of the information data when a determination is made that the disposition of the information data to the recording medium is inappropriate, poor printing on the recording medium can be securely prevented beforehand. Incidentally, in the control step, when a determination is made that the disposition of the information data to the recording medium is inappropriate in the determining step, such controlling processing may be employed that, for example, the disposition position of the information data is modified or adjusted forcibly, development of an image of the information data on an image memory is made impossible, or an image is allowed to develop but a final image can not be defined.

Here, in the third aspect, the attribute information may be constituted with lack allowance rank information expressing an allowance degree to a lack which occurs at least a portion of the information data due to that the information data overflows from the recording medium and/or overlap allowance rank information expressing an allowance degree to an overlap of the information data on different other information data, and/or printing prohibition region setting information expressing a printing prohibition region for prohibiting printing processing, at a time of printing processing to the recording medium.

A fourth aspect of the present invention provides a program for information layout that performs layout of information data to a recording medium, which causes a computer to realize: a function of inputting the information data; a function of setting attribute information inherent to the inputted information data; a function of setting disposition of the information data to the recording medium; a function of determining about whether disposition of the information data to the recording medium is appropriate based upon set disposition position information of the information data and the set attribute information of the information data; and a function of allowing to display disposition inappropriateness information of the information data when a determination by the determining function is made that the disposition of the information data to the recording medium is inappropriate.

In the fourth aspect, the set attribute information may be constituted with at least one of lack allowance rank information expressing an allowance degree to a lack which occurs at least at a portion of the information data due to that the information data overflows from the recording medium, overlap allowable rank information expressing an allowance degree to an overlap of the information data on different other information data, and printing prohibition region setting information expressing a printing prohibition region for prohibiting printing processing, at a time of printing processing to the recording medium. According to this aspect, since appropriateness about the disposition position information can be determined for each information data, and when a determination is made that the disposition of information data is inappropriate, disposition inappropriateness information of the information data is allowed to display, which calls an attention in advance to a user who is to perform printing processing on a printing medium so that poor printing to the printing medium can be prevented beforehand.

Here, in this aspect, a function of limiting the disposition position of the information data when a determination by the determining function is made that the disposition of the information data to the recording medium is inappropriate, or a function of adjusting the disposition position of the information data when a determination by the determining function is made that the disposition of the information data to the recording medium is inappropriate, may be provided.

DETAILED EXPLANATION OF PREFERRED EMBODIMENTS

Embodiments of a printing system to which the present invention can be applied will be explained below with reference to the drawings.

Figure 1:
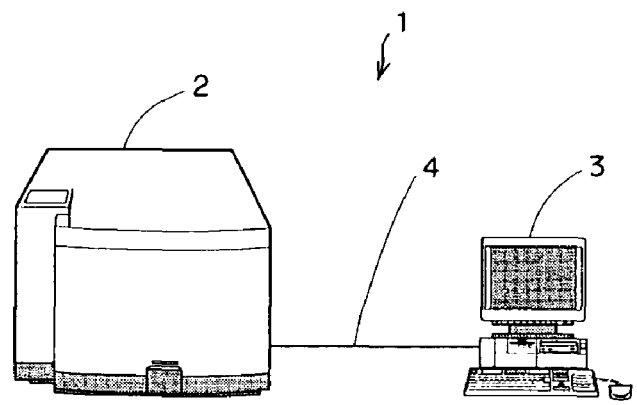
FIG. 1 is an appearance view of a printing system of an embodiment to which the present invention can be applied.

As shown in FIG. 1, in a printing system 1 of this embodiment, a printing apparatus 2 which prints information data such as an image or the like on such a recording medium as an IC card or the like, and a personal computer (hereinafter, referred to as PC) 3, serving as a main body apparatus which produces information data such as an image or the like on such a recording medium as an IC card or the like, and a personal computer (hereinafter, referred to as PC) 3, serving as a main body apparatus which produces information data such as an image or the like and which transmits information data such as an image or the like to the printing apparatus 2, are connected by a connecting cable 4 such as 100 base T or the like.

Figure 2:
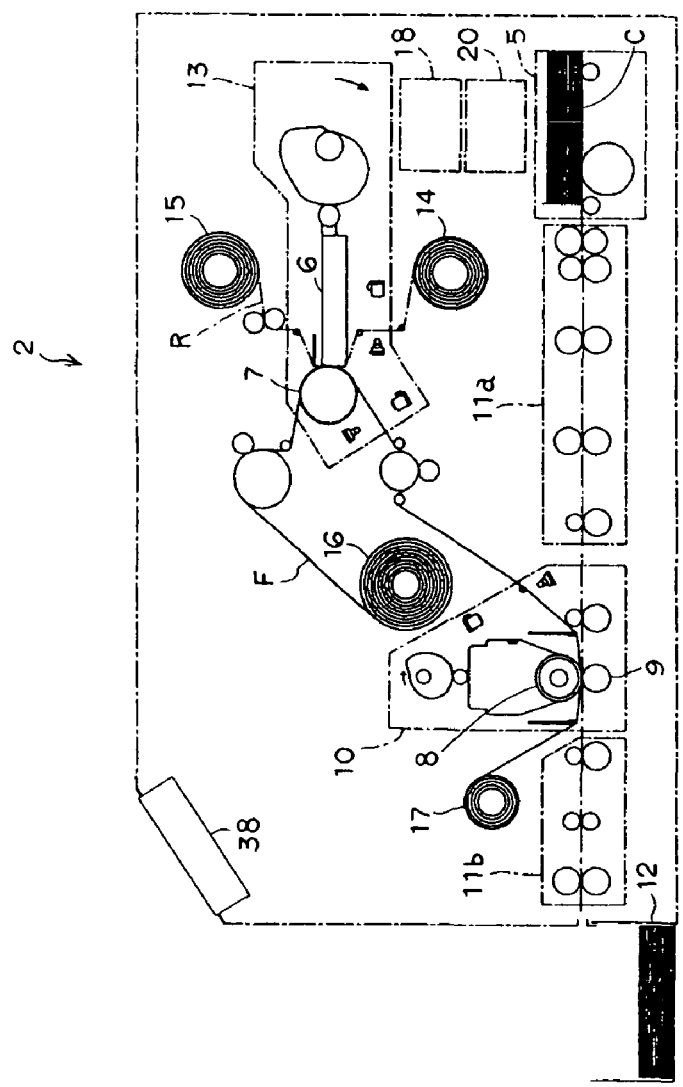
FIG. 2 is a front sectional view of a printing apparatus constituting the printing system of the embodiment.

As shown in FIG. 2, the printing apparatus 2 is provided with an image forming section 13 which forms an image on an intermediate transfer sheet F supplied from an intermediate transfer sheet supplying section 16 and taken (wound) up on an intermediate transfer sheet taking-up section 17, and a transfer section 10 which transfers (prints) an image formed on the intermediate transfer sheet F onto a surface side of an IC card C. The image forming section 13 adopts a constitution of a thermal transfer printer and has a platen roller 7 supporting the intermediate transfer sheet F at a time of image formation onto the intermediate transfer sheet F and a thermal head 6 disposed so as to advance/retract to the platen roller 7. Besides the intermediate transfer sheet F, a thermal transfer sheet R which is supplied from a thermal transfer sheet supplying section 14 and taken up on a thermal transfer sheet taking-up section 15 and which repeats of inks of Y (yellow), M (magenta), C (cyan) in a surface sequence are interposed between the platen roller 7 and the thermal head 6. On the other hand, the transfer section 10 has a platen roller 9 which supports an IC card C at a time of transfer to the IC card C and a heat roller 8 disposed so as to advance/retract to platen roller 9. A heat-generating lamp disposed for heating an intermediate transfer sheet F is housed in the heat roller 8. The intermediate transfer sheet F is interposed between the platen roller 9 and the heat roller 8.

Further, the printing apparatus 2 is provided with a card supplying section 5 which accommodates a plurality of blank IC cards C in a stacking manner and feeds the IC cards C one by one, a horizontal conveying section 11a which has cleaning roller pairs for cleaning surfaces of the IC card C and conveys the IC card C to the transfer section 10 substantially in a horizontal direction, and a conveying and discharging section 11b which conveys the IC card C with a surface side on which an image has been transferred (printed) in the transfer section 10 substantially in a horizontal direction and which discharges the IC card C via a discharging port with a thin rectangular shape so that a stacker 12 receives the IC cards C in a stacked manner.

The printing apparatus 2 is further provided with a power supply section 18 which converts a commercially available AC power source to a DC power source which allows driving/operation of each mechanical section, a control section and the like, a control section 20 which controls operation of the whole printing apparatus 2, and a touch panel 38 which displays a status of the printing apparatus 2 or the like in accordance with information from the control section 20 which allows inputting of instructions on an operation command and of information to the control section 20 according to operation of an operator.

Figure 3:
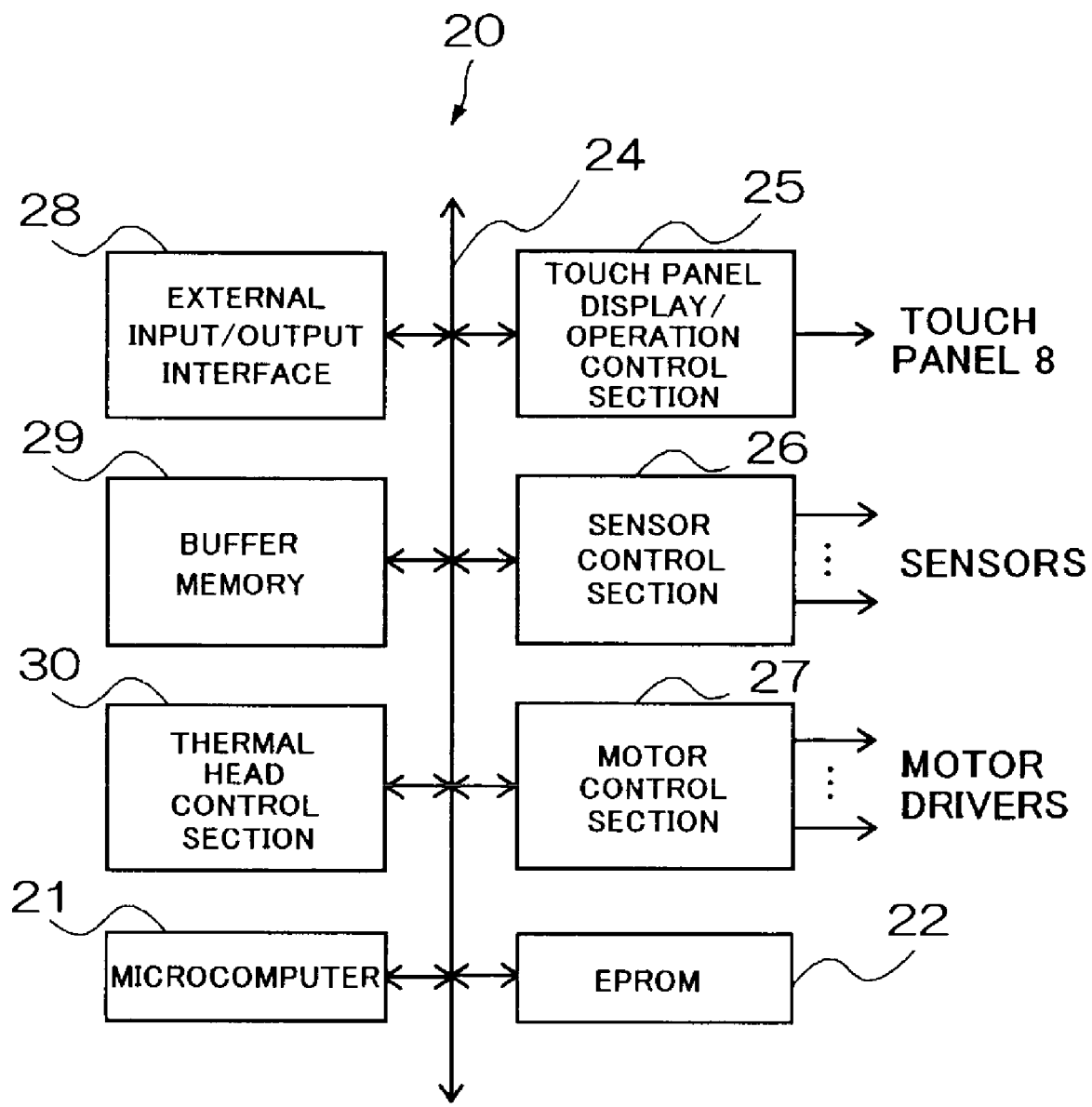
FIG. 3 is a block diagram showing a schematic constitution of a control section of the printing apparatus.

As shown in FIG. 3, the control section 20 is provided with a microcomputer 21, serving as a determining unit, and a control unit, which performs control processing of the printing apparatus 2. The microcomputer 21 is constituted so as to include a CPU operating as a central processing unit with a high-speed clock, a ROM in which control actions of the printing apparatus 2 have been stored, and a RAM which works as a working area for the CPU and in which image information can be developed.

An external bus 24 is connected to the microcomputer 21. An EPROM 22, in which information about maximum error values which represent values of print position errors occurring at a time of transfer carried out by the transfer section 10 and which are inherent to the printing apparatus 2 have been written, is connected to the external bus 24. The maximum error values are written in the EPROM by printing a layout image for error measurement on the IC card C to measure print position errors of the transfer section 10 (e.g., to measure position shift amounts of a central portion and corners of the layout image) at a time of a complete test on the printing apparatus 2, and conducting setting to a safety side from a statistical distribution of print position errors in printing apparatuses of the same type in accordance with the measured print position errors. The maximum error values are represented by numerical values, having a unit of "dot" or "mm", of print position errors in a horizontal direction and in a vertical direction to a reference position (e.g., a center or corners) of the recording medium.

Further, the external bus 24 is connected to a touch panel display/operation control section 25 which controls an indication of a touch panel 38 and an operation command inputted from the touch panel 38, a sensor control section 26 which controls signals from various sensors, a motor control section 27 which controls motor drivers which feed drive pulses to each motor or the like, a thermal head control section 30 which controls thermal energy of the thermal head 6, an external input/output interface 28 for conducting communication with the PC 3, and a buffer memory 29 which temporarily saves image data or the like fed from the PC 3. The touch panel display/operation control section 25, the sensor control section 26, the motor control section 27, and the thermal head control section 30 are respectively connected to the touch panel 28, various sensors, various motor drivers, and the thermal head 6. Incidentally, the external input/output interface 28 is connected to the connecting cable 4.

Figure 11:
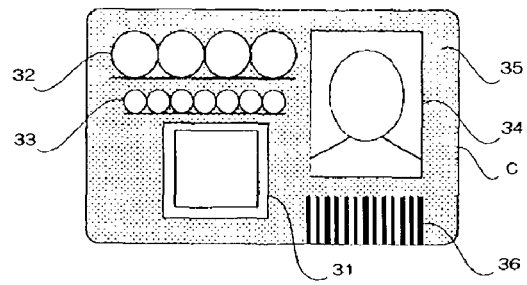
FIG. 11 is a plan view of one example of an IC card on which printing is carried out by the printing apparatus.

Next, operations of the printing system 1 of this embodiment will be explained in the order of a layout processing routine which is executed at a side of the PC 3 for laying out various information data on the surface side of the IC card C, and printing on the IC card C performed at a side of the printing apparatus 2 in accordance with a layout image (a bitmap image) produced in the layout processing routine. Incidentally, for simplification of explanation, as shown in FIG. 11, an example where a name 32 of an owner of the IC card C, a name 33 of a company to which the owner belongs, a face photograph 34 of the owner, a background image 35 and a barcode 36 expressing an ID of the owner are disposed to print them on a surface side of a blank IC card C having contacts 31 will be explained in detail.

Figure 4:
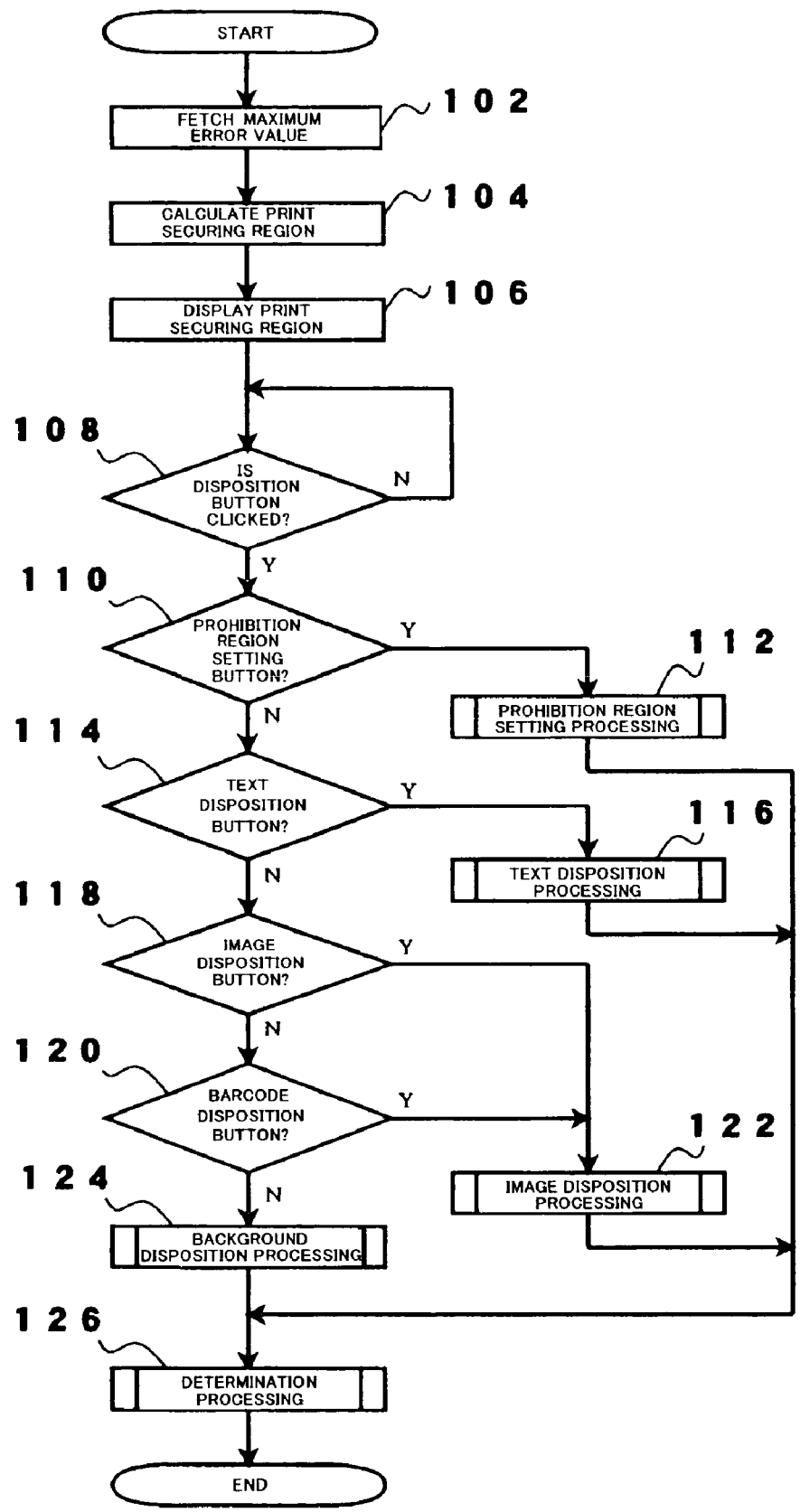
FIG. 4 is a flowchart of a layout processing routine that a personal computer executes.

As shown in FIG. 4, in the layout processing routine, first, in step 102, the PC 3 requests the side of the printing apparatus 2 to transmit the maximum error values stored in the EPROM 22 of the printing apparatus 2 and fetches the transmitted maximum error values. Incidentally, the maximum error values are developed in the RAM of the microcomputer 21 by turning the control section 20 on. In the next step 104, the PC 3 calculates a print securing region guaranteeing that a lack in an image (overflow or going beyond outer limits) does not occur on the IC card C according to the fetched maximum error values.

Figure 12:
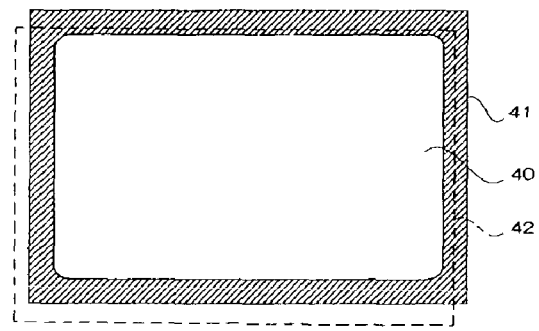
FIG. 12 is an explanatory diagram showing a relationship among a disposition allowable region, a print securing region and a print position error.

As shown in FIG. 12, a disposition allowable region 41 indicates the widest region on which an image of information data can be laid out. The disposition allowable region 41 shifts to a region 42 indicated by a dotted line due to the print position errors inherent to the printing apparatus 2 when printing is conducted on the surface side of the IC card C. When a region has a size which can be arranged within a real size of the IC card C and which is formed with a safety margin of, for example, about 0.5 mm (8 dots) per one side to the region 42, a lack due to the print position errors of the printing apparatus 2 does not occur on the IC card C in an image (the above-described name of the owner of the IC card 32 or the like) of information data laid out in this region (hereinafter, this region is referred to as a print securing region 40). Accordingly, in step 104, the print securing region 40 with the safety margin within the real size of the IC card C is calculated even if there is a print deviation due to the maximum error values. Incidentally, a lack (overflowing from the IC card C) may occur on the IC card C in the image of the information data disposed or arranged in the disposition allowable region 41, unless the image is disposed within the print securing region 40.

Figure 13:
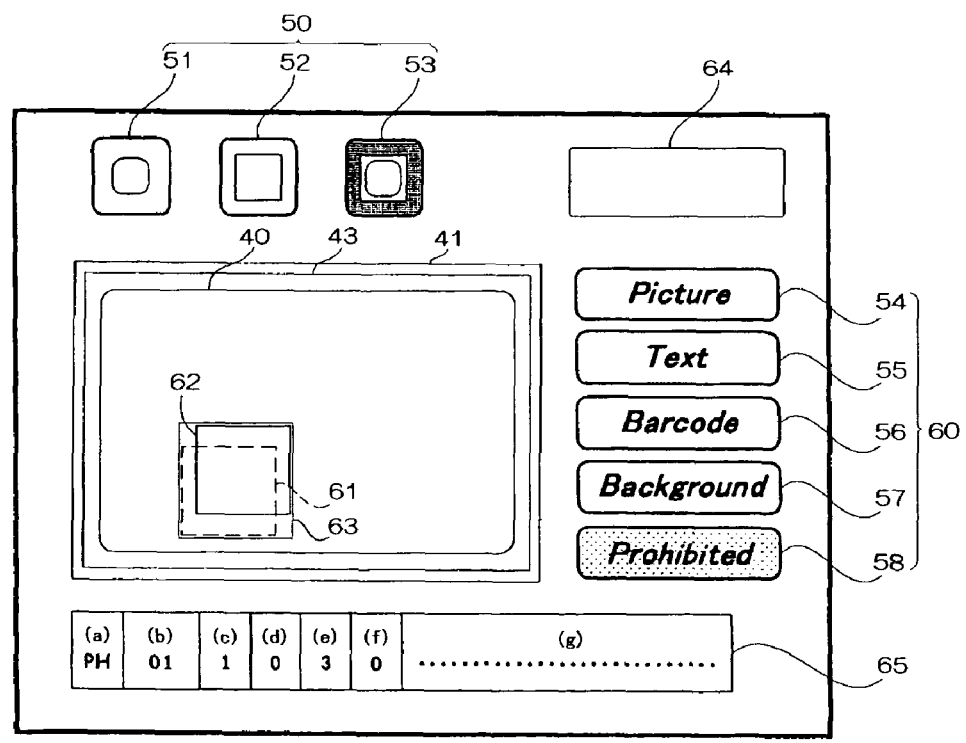
FIG. 13 is an explanatory diagram illustratively showing a form of application software for layout displayed on a display of a personal computer and utilized when setting an prohibition region within the print securing region.

Next, in step 106, besides the print securing region 40, the disposition allowable region 41 and a background image layout region 43 for laying out a background image are displayed on a display of the PC 3 (refer to FIG. 13). Incidentally, since a background image disposed in the background image layout region 43 is larger than the print securing region 40, the background image to the IC card C includes a lack (the background image goes beyond the IC card C).

As shown in FIG. 13, besides the above-described disposition allowable region 41, print securing region 40 and background image layout region 43, displayed on the display of the PC 3 is a form of application software for layout in which disposition buttons 60 comprising an image disposition button 54 for selecting disposition of an image such as a face photograph, a logo of a company or the like within the disposition allowable region 41, a text disposition button 55 for selecting disposition of an image of text characters such as a name, a company name or the like, a barcode disposition button 56 for selecting disposition of an image of a barcode, a background disposition button 57 for selecting disposition of a background image, and an prohibition region setting button 58 for selecting setting of a print prohibiting region where printing is prohibited within the print securing region 40; a setting information field 65 for setting/displaying attribute information inherent to various information data; an information displaying field 64 serving as an information displaying unit for displaying a message to an operator; and region display switching buttons 50 comprising a print securing region displaying button 51 for displaying the print securing region 40 only, an disposition allowable region displaying button 52 for displaying the disposition allowable region 41 only, and a whole region displaying button 53 for displaying the print securing region 40, the background image layout region 43 and the disposition allowable region 41 so as to distinguish them with a frame line are arranged. Incidentally, the application software on its function in this embodiment is constituted to have a unillustrated determining unit which determines about whether or not disposition (arrangement) of information data to the IC card C is appropriate based upon the disposition position information of information data positioned by the disposition buttons 60 and the setting information (attribute information) set by the setting information field 65.

In step 108, a standby state is maintained until any one of the disposition buttons 60 is clicked, and when any one of the disposition buttons 60 is clicked, a determination is made in the next step 110 about whether or not the clicked button is the prohibition region setting button 58, and the routine proceeds to step 112 when the determination is affirmative. When the determination is negative, a determination is made in step 114 about whether or not the clicked button is the text disposition button 55, and the routine proceeds to step 116 when the determination is affirmative. When the determination is negative, a determination is made in step 118 about whether or not the clicked button is the image disposition button 54, and when the determination is negative, a determination is made in step 120 about whether or not the barcode disposition button 56 is clicked. When the determination is affirmative or an affirmative determination is made in step 118, the routine proceeds to step 122. When a negative determination is made in step 120, the routine proceeds to step 124 since the background disposition button 57 is clicked. That is, in step 108 to step 120, either one of a prohibition region setting processing subroutine (step 112) for setting a print prohibition region within the print securing region 40, a text arrangement processing subroutine (step 116) for disposing an image of text characters, an image disposition processing subroutine (step 122) for disposing an image, and a background disposition processing subroutine (step 124) for disposing a background image is executed according to the clicked disposition button 60.

Figure 5:
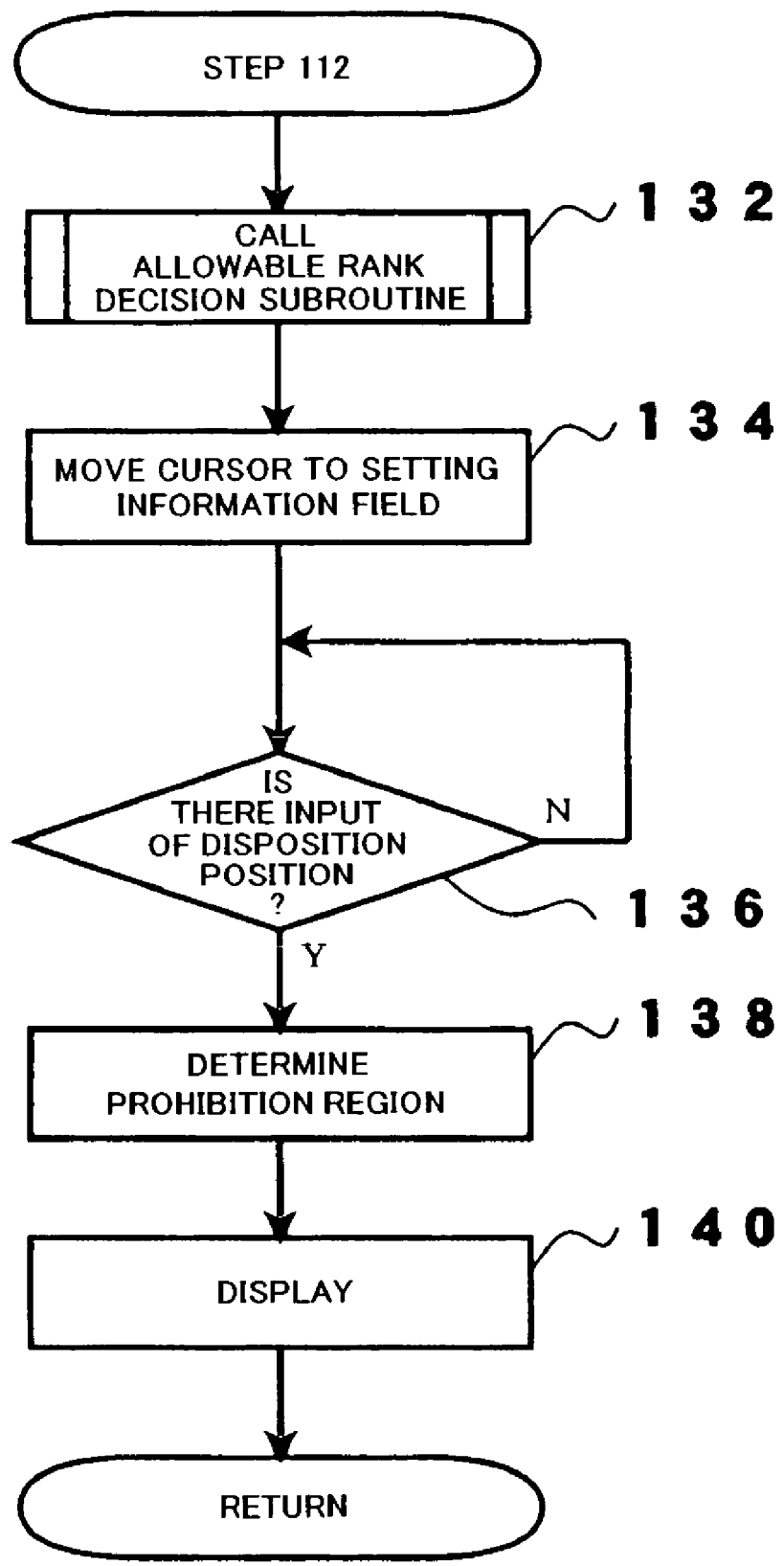
FIG. 5 is a flowchart of a prohibition region setting processing subroutine showing details of step 112 of the layout processing routine.
Figure 6:
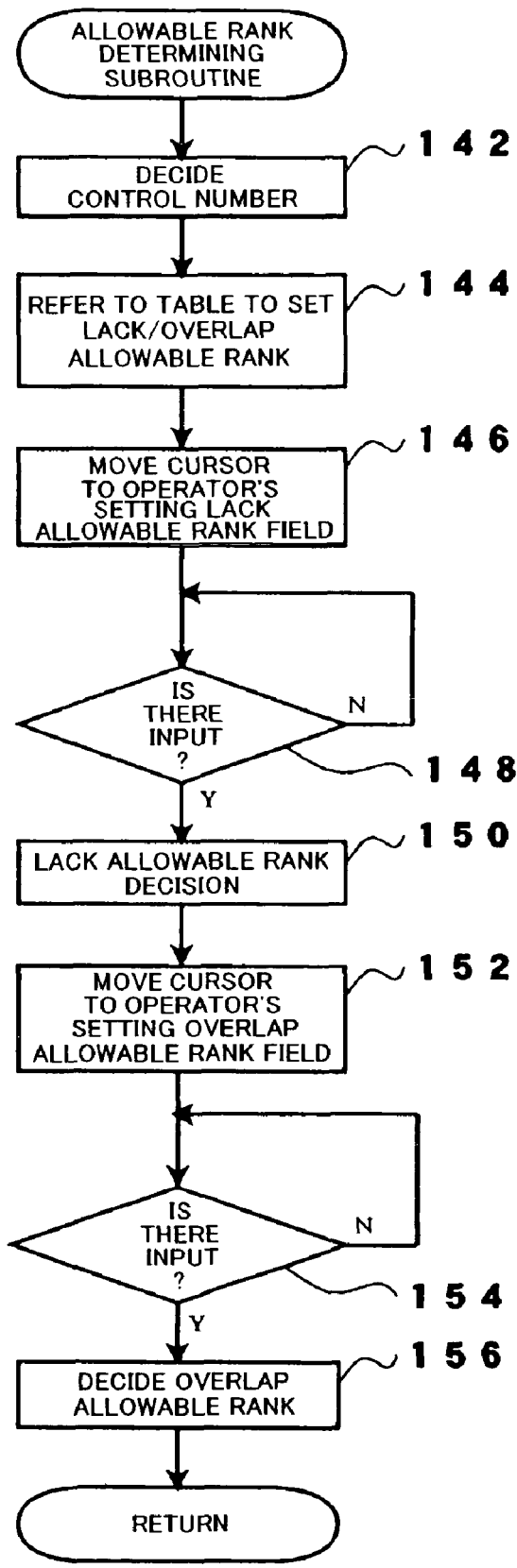
FIG. 6 is a flowchart of an allowable rank determining subroutine called by the prohibition region setting processing subroutine.

As shown in FIG. 5, in the prohibition region setting processing subroutine, an allowable rank determining subroutine is called in step 132. As shown in FIG. 6, in this allowable rank determining subroutine, a control number allocated to each of information data is first decided in step 142. As shown at (b) in the setting information field 65 of FIG. 13, the control numbers are continuous numbers that start from 01 and are incremented by one. Incidentally, (a) in the setting information field 65 of FIG. 13 represents a type of information data, where "PH" indicating the abbreviated sign of a prohibition region is displayed.

In the next step 144, by referring to Table 1 below, an allowable rank of a default value to a lack and an allowable rank of a default value to an overlap are set and displayed (refer to (c), (e) in the setting information field 65 of FIG. 13).

TABLE 1

| Type of Information Data | Default Value to Lack | Default Value to Overlap |
|---|---|---|
| Image | 2 | 3 |
| Text | 3 | 3 |
| Barcode | 2 | 3 |
| Background | 1 | 1 |
| Prohibition Region | 1 | 3 |

As shown in Table 1, types of the information data are classified into five types: an image (a bitmap of the face photograph 34 in this example), a text (a bitmap of text characters of a name and a company name in this example), a barcode (a bitmap of a barcode representing an ID of the owner of the IC card C in this example), a background (a bitmap of a background image with 1360 dots×880 dots printed at a resolution of 16 dot/mm in this example), and a prohibition region. Further, in Table 1, an allowable rank "3" of a default value to a lack means a rank which does not allow an overflow (lack) from the print securing region 40, an allowable rank "2" means a rank which allows an overflow (lack) from the print securing region 40 but does not allow an overflow under a certain condition, as described later, and an allowable rank "1" means a rank which allows an overflow. Further, an allowable rank "3" of a default vale to an overlap means a rank which does not allow an overlap with other information data within the print securing region 40, and an allowable rank "1" means a rank which allows an overlap. Accordingly, in step 144, as shown in FIG. 13, "1" as a default value is set to/displayed at (c) allowable rank to a lack in the setting information field 65, and "3" as a default value is set to/displayed at (e) allowable rank an overlap in the setting information field 65.

Instep 146, a cursor is moved to (d) operator's (user's) setting allowable rank to a lack in the setting information field 65, and in the next step 148, a standby state is maintained until there is an input. "0" as a default value is set to/displayed at (d) operator's setting allowable rank to a lack in the setting information field 65 so as to allow an operator to input the setting allowable rank. When an operator does not find any problem to retain the default value at (c) allowable rank to a lack in the setting information field 65, inputting is made by pressing, for example, a return key. In the next step 150, a determination is made about whether or not (d) operator's setting allowable rank to a lack in the setting information field 65 is "0". When the determination is affirmative, (c) operator's allowable rank of the default value to a lack in the setting information field 65 is decided to set as a lack allowable rank to the print securing region 40, and when the determination is negative, (d) operator's allowable rank to a lack in the setting information field 65 is decided to set as the lack allowable rank to the print securing region 40. Incidentally, when a numeral value other than "0" to "3" is input in step 148, an alarm is displayed in the information display field 64 to indicate that an input is inappropriate and a standby state is maintained until there is an appropriate input.

In the next step 152, a cursor is moved to (f) operator's setting allowable rank to an overlap in the setting information field 65, and a standby state is maintained until there is an input in step 154. Like (d) operator's setting allowable rank to a lack, since an operator's setting allowable rank is input at (f) operator's setting allowable rank to an overlap in the setting information field 65, "0" as a default value is set and displayed. When an operator does not find any problem to retain the default value at (e) allowable rank to an overlap in the setting information field 65, inputting is made by pressing, for example, a return key. In the next step 156, a determination is made about whether or not (f) operator's setting allowable rank to an overlap in the setting information field 65 is "0". When the determination is affirmative, (e) allowable rank of the default value to an overlap in the setting information field 65 is decided to set as an overlap allowable rank within the print securing region 40, and when the determination is negative, (f) operator's setting allowable rank to an overlap in the setting information field 65 is decided to set as the overlap allowable rank within the print securing region 40. Then, the allowable rank determining subroutine is terminated and the routine proceeds to step 134 shown in FIG. 5. Incidentally, when a numeral value other than "0", "1" and "3" is inputted in step 154, an alarm is displayed in the information displaying field 64 to indicate that an input is inappropriate and a standby state is maintained until there is an appropriate input.

In step 134 in FIG. 5, a cursor is moved to (g) setting information in the setting information field 65 as shown in FIG. 13, and a standby state is maintained until there is an input of a disposition position for a prohibition region in step 136. As shown in Table 2 below, (g) setting information in the setting information field 65 includes the disposition position, and may included other information depending on a type of the information data as described later.

TABLE 2

| Type of Information Data | Contents of Setting Information |
| --- | --- |
| Image | Disposition Position, Lack Disallowable Region |
| Text | Disposition Position, Character Form, Point, Boldface, Italics, Color |
| Barcode | Disposition Position |
| Prohibition Region | Disposition Position, Determined Prohibiting Region |

Figure 14:
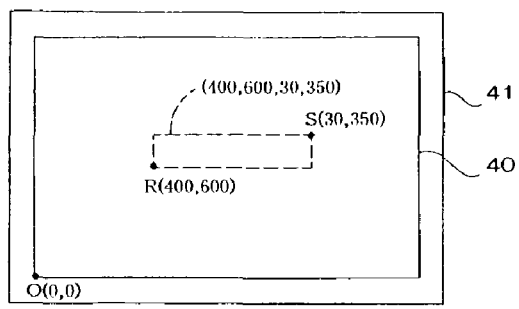
FIG. 14 is an explanatory diagram illustratively showing a disposition position of information data.

As shown in FIG. 14, when one end portion of the print securing region 40 is defined as the origin O (0, 0), and in a case that information data has a starting point R (400, 600) and a vertical and horizontal size S (30, 350), a disposition position is expressed as (400, 600, 30, 350), and dot is used as a unit in this example. Accordingly, in step 136, the disposition position 62 to the origin O (0,0) is inputted by an operator.

In the next step 138, the disposition position is fetched to calculate/determine the prohibition region. When an image is to be printed on the contacts 31 of the IC card C, since the image can not be formed on the contacts 31 due to undulation of the surface caused by the contacts 31 and due to metal component composition of the contact 31, and in some cases the IC card C does not function due to a thermal influence at a time of printing, it is necessary to set the prohibition region which prohibits image formation intentionally. As shown in FIG. 13, in step 136, the disposition position 62 of the prohibition region to the origin O (0,0) was inputted to (g) setting information in the setting information field 65, however, the print position error inherent to the printing apparatus 2 gives an influence as described above. Therefore, in step 138, a maximum deviation region 61 where the disposition position 62 of the prohibition region causes the maximum position deviation within the print securing region 40 is calculated based upon the maximum error values fetched in step 102, so that a region 63 having a safety margin formed, for example, about 8 dots (0.5 mm) per side is determined to both of the disposition position 62 of the prohibition region and the maximum deviation region 61. Thereby, such a problem can be solved that an image is not formed due to the print position error, or the IC card C does not function (hereinafter, the region thus determined is referred to as a determined prohibition region 63).

In the next step 140, as shown in FIG. 13, the determined prohibition region 63 is displayed within the print securing region 40, and the position information of the disposition position of the determined prohibition region 63 is displayed at (g) setting information in the setting information field 65. Then, the prohibition region setting processing subroutine is terminated and the routine proceeds to step 126 in FIG. 4.

Figure 7:
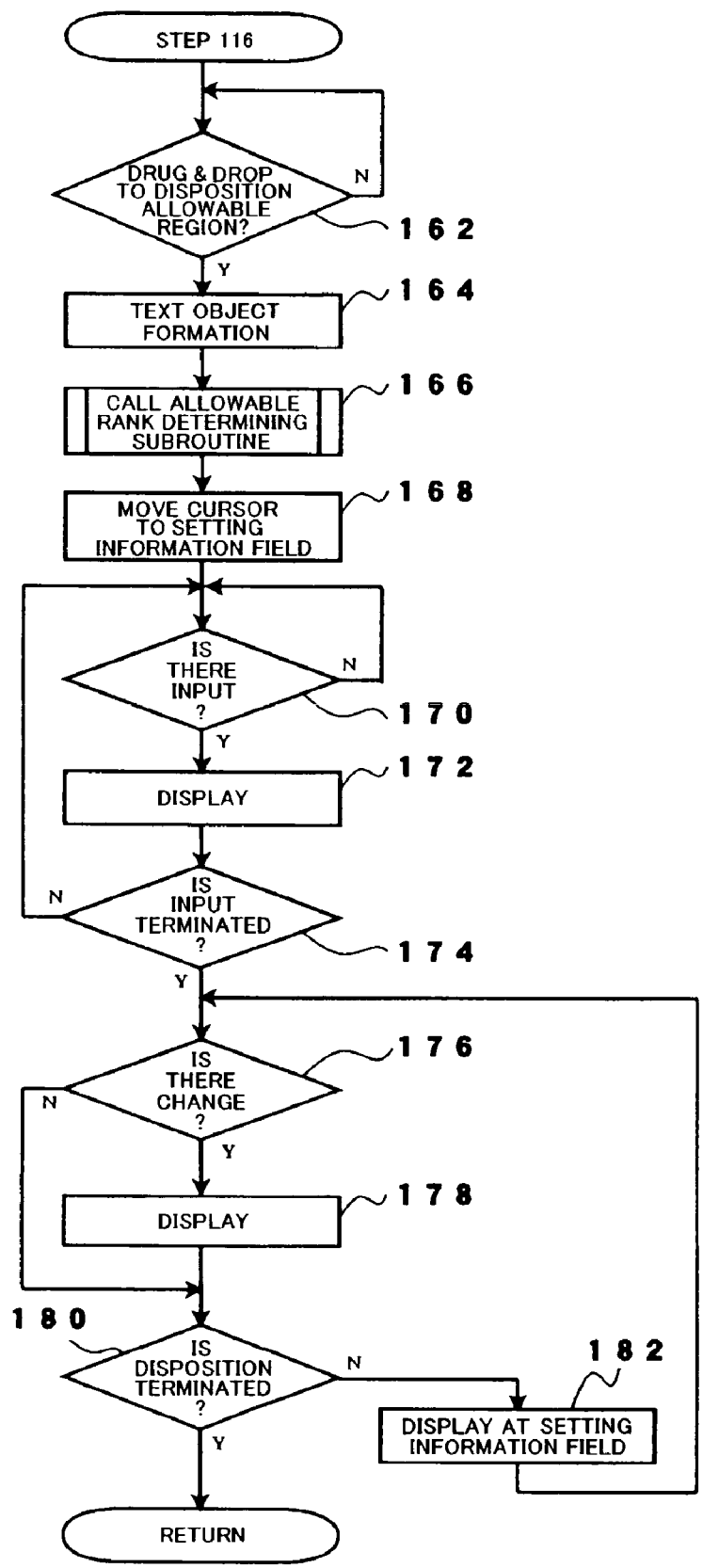
FIG. 7 is a flowchart of a text disposition processing subroutine showing details of step 116 of the layout processing routine.

As shown in FIG. 7, in the text disposition processing subroutine, in step 162, first, a standby state is maintained until the text disposition button 55 is drugged and dropped within the disposition allowable region 41, and when dragging/dropping is performed, a real body of an object (a bit map) is produced in step 164.

Figure 15:
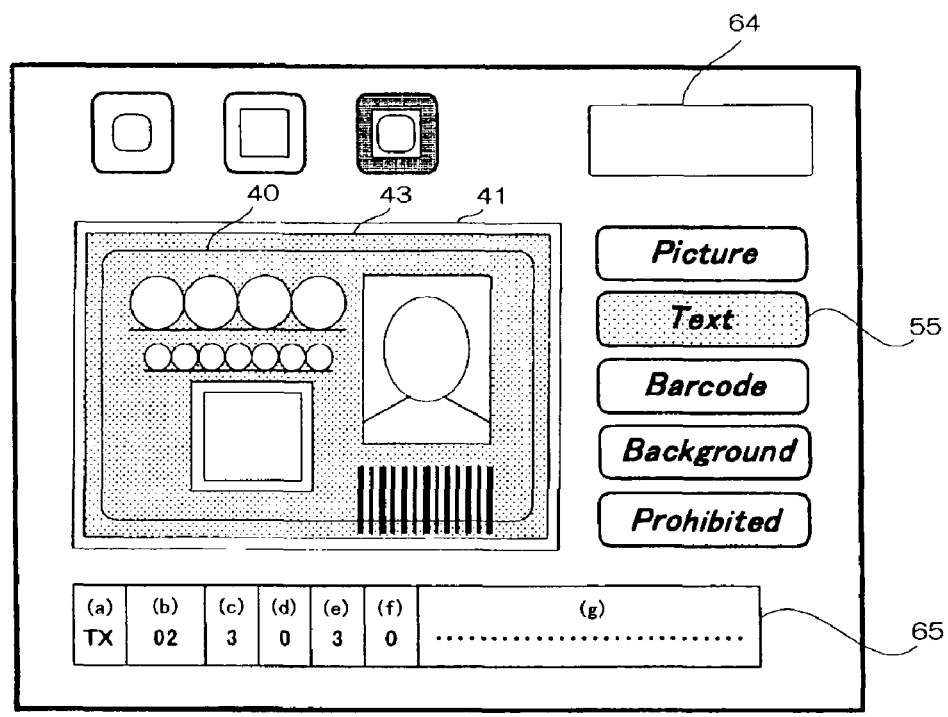
FIG. 15 is an explanatory diagram illustratively showing a form of the application software for layout displayed on the display of the personal computer and showing a state after information data is laid out within the disposition allowable region.

In the next step 166, the allowable rank determining subroutine shown in FIG. 6 is called and executed. As shown in FIG. 15, "TX" expressing an abbreviated sign of text is displayed at (a) type of information data in the setting information field 65, and a continuous number is given to (b) control number ("02" indicating the second is given in FIG. 15). Further, since the text characters such as a name (or a company name) or the like are not allowed to lack or overlap with information data other than a background image, as shown in Table 1, "3" is set to/displayed at (c) allowable rank of the default value to a lack and (e) allowable rank of the default value to an overlap. Furthermore, the lack allowable rank to the print securing region 40 and the allowable rank of an overlap within the print securing region 40 are determined according to inputted values at (d) operator's setting allowable rank to a lack and (f) operator's setting allowable rank to an overlap which have been inputted by an operator like the case of the above-described decision of the prohibition region (steps 150, 156).

In the next step 168, a cursor is moved to (g) setting information in the setting information field 65, and a standby state is maintained until there is an input from an operator in step 170. As shown in Table 2, when the type of information data is text, besides the disposition position shown in FIG. 14, inputting for selecting a character form and a point for the text, selecting whether to be a boldface for the text, selecting whether to be italics, and for selecting a color is allowed at (g) setting information. When an input occurs in step 170, the disposition position of the (text) object disposed within the disposition allowable region 41, the character form, point, boldface, italics and color are changed and displayed in accordance with the inputted contents, and information inputted into (g) setting information is displayed in step 172. In step 174, a determination is made about whether or not all inputting contents from the disposition position to the color have been completed at (g) setting information, and when the determination is negative, the routine is returned to step 170 to allow continuation of inputting, while the routine proceeds to step 176 when the determination is affirmative. Accordingly, in step 170 to step 174, the information about the disposition position, character, point, boldface, italics, and color are sequentially given to the object disposed within the disposition allowable region 41, and a bitmap of text characters (hereinafter, referred to as a text object) is formed.

Next, in step 176, a determination is made about whether or not the disposition position to which the text object is drugged is changed by dragging from the position where the input is completed in step 174, and when the determination is negative, the routine proceeds to step 180, while when the determination is affirmative, in the next step 178, the text object is displayed at the drugged position and the position information about the disposition position is fetched. In step 180, a determination is made about whether or not the disposition processing of the text is terminated, for example, by determining whether or not a return key is pressed. When the determination is negative, in the next step 182, the position information of the disposition position of (g) setting information is changed/displayed to the position information of the disposition position changed by the drugging, then, the routine is returned to step 176, while, when the determination is affirmative, the text disposition processing subroutine is terminated and the routine proceeds to step 126 in FIG. 4.

Figure 8:
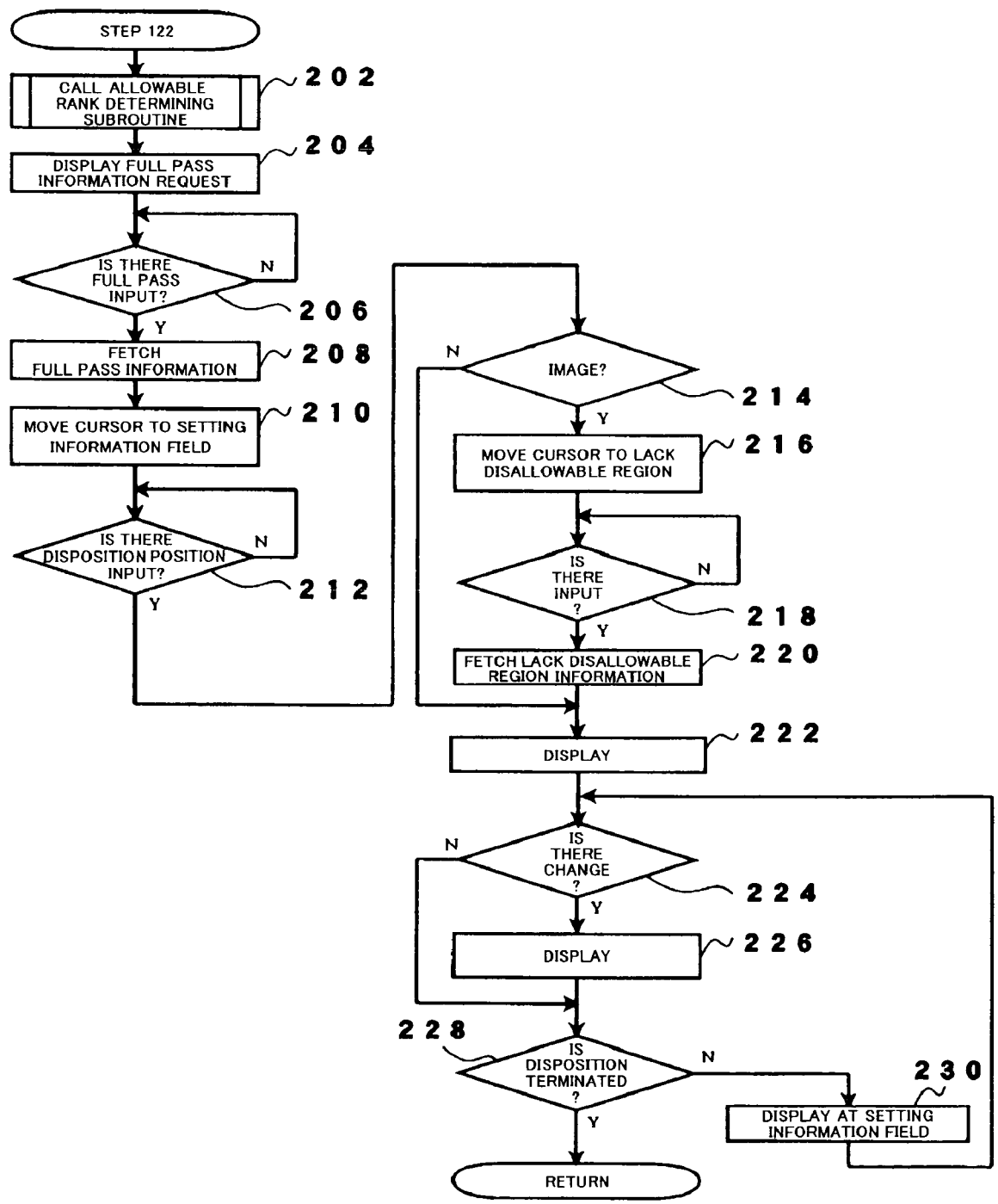
FIG. 8 is a flowchart of an image disposition processing subroutine showing details of step 122 of the layout processing routine.

As shown in FIG. 8, in the image disposition processing subroutine, in step 202, the allowable rank determining subroutine shown in FIG. 6 is called and executed. When the image disposition button 54 is clicked, "PT" expressing an abbreviated sign of a picture (image) is displayed at (a) type of information data in the setting information field 65, and when the barcode disposition button 56 is clicked, "BC" expressing an abbreviated sign of a barcode is displayed at (a) type of information data in the setting information field 65, and the continuous number is given to (b) control number.

Figure 16:
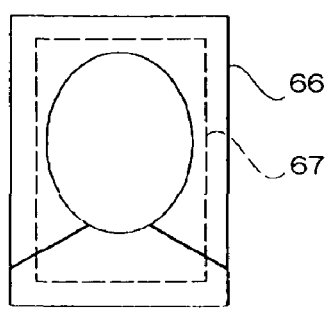
FIG. 16 illustrates an image having both an image region and a lack disallowable region.

As shown in FIG. 16, in case of an image such as a face photograph of this example, as far as a lack disallowable region 67 including a position of a face does not lack from the IC card C, even if a portion of an image region 66 lacks from the IC card C, it does not cause a poor printing. On the other hand, as shown in FIG. 15, in case of the barcode, even if the barcode overflows from the IC card C in a vertical direction, the barcode can be read by a barcode reader so that the ID of the owner can be recognized. However, when the barcode overflows from the IC card C in a horizontal direction, a portion thereof lacks so that the ID of the owner can not be recognized. Further, an image like a face photograph and a barcode are not allowed to overlap with other information data. Accordingly, as shown in Table 1, in case of an image or a barcode, "2" as a default value is set to (c) allowable rank to a lack in the setting information field 65, and "3" as a default value is set to (e) allowable rank to an overlap. Furthermore, the lack allowable rank to the print securing region 40 and the allowable rank of an overlap within the print securing region 40 are determined according to inputted values at (d) operator's setting allowable rank to a lack and (f) operator's setting allowable rank to an overlap which have been inputted by an operator like the case of the above-described decision of the prohibition region (steps 150, 156).

In the next step 204, a comment requesting an operator to input full pass information to a folder in which bitmaps of images or barcodes are stored is displayed at the information displaying field 64, and in the next step 206, a standby state is maintained until the full pass information is inputted. When the full pass information is inputted, the full pass information is fetched in step 208. In the next step 210, a cursor is moved to the setting information in the setting information field 65 and a standby state is maintained until inputting of a disposition position of a bitmap of an image or a barcode occurs. When the inputting occurs, a determination is made in step 214 about whether or not information data is an image, and when the determination is negative (when a barcode), the routine proceeds to step 222. On the other hand, when the determination is affirmative, in step 216, a cursor is moved to the lack disallowable region (field) disposed on the right side of the disposition position and a standby state is maintained until there is an input in step 218 in order to set the disposition position of the lack disallowable region 67, as shown in Table 2. This setting can be conducted by inputting a starting point as well as vertical and horizontal sizes like the case of the disposition position shown in FIG. 14. When the position information of the disposition position of the lack disallowable region 67 is inputted in step 220, the inputted information is fetched in the next step 220, and the image or the barcode is displayed within the disposition allowable region 41 in step 222. In this case, the lack disallowable region 67 of the image may be indicated with a frame line.

In the next step 224, a determination is made about whether or not the disposition position to which the image or the barcode is drugged is changed from the position displayed in step 222, and when a negative determination is made, the routine proceeds to step 228, while the image or the barcode is displayed at the drugged position and the position information of the disposition position is fetched in the next step 226 when an affirmative determination is made. In step 228, a determination is made about whether or not the disposition processing of the image or the barcode is terminated, for example, by determining whether or not a return key is pressed. When a negative determination is made, in the next step 230, the position information of the disposition position (the disposition position of the lack disallowable region is further included in case of an image) of (g) setting information is changed lo the position information of the disposition position which is changed by the drugging so as to display the changed position information, and the routine is returned to step 224. When an affirmative determination is made, the image disposition processing subroutine is terminated, and the routine proceeds to step 126 shown in FIG. 4.

Figure 9:
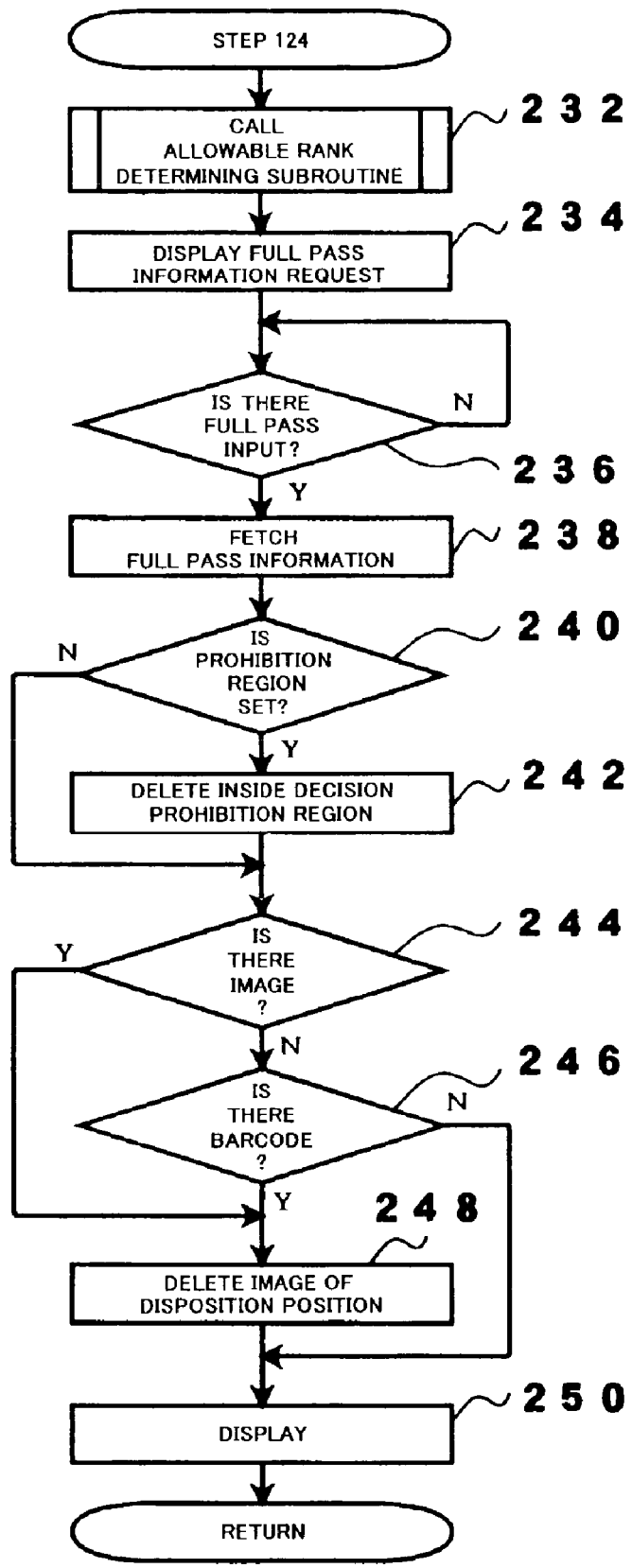
FIG. 9 is a flowchart of a background disposition processing subroutine showing details of step 124 of the layout processing routine.

As shown in FIG. 9, in the background disposition processing subroutine, the allowable rank determining subroutine shown in FIG. 6 is called and executed in step 232. "BG" expressing an abbreviated sign of the background is displayed at (a) type of the information data in the setting information field 65, and a continuous number is given to (b) control number. As shown in FIG. 15, since the background image layout region 43 is larger than the print securing region 40 and it overflows from the print securing region 40 originally, as shown in Table 1, "1" as a default value is set to (c) allowable rank to a lack, and "1" as a default value is set to (e) allowable rank to an overlap in order to process the overlap in step 240 to step 228 as described later. Further, the lack allowable rank to the print securing region 40 and the overlap allowable rank within the print securing region 40 are determined in accordance with values inputted by an operator to (d) operator's setting allowable rank to a lack and (f) operator's setting allowable rank to an overlap, like the above-described case of decision of the prohibition region (steps 150, 156).

In the next step 234, a comment for requesting an operator to input full pass information to a folder where a bitmap of the background is stored is displayed at the information displaying field 64, and in the next step 236, a standby state is maintained until full pass information is inputted. When the full pass information is inputted, the full pass information is fetched in step 238.

In the next step, a determination is made about whether or not (the disposition position 61 of) the prohibition region has been set. Such a determination can be made by referencing to (a) type of information data in the setting information field 65 regarding all information data. When the determination is affirmative, an image within the determined prohibition region 63 is deleted from the background (a blank is formed) in step 242, and when the determination is negative, a determination is made in steps 244, 246 about whether or not the image and/or the barcode is disposed. Even in such a determination, the determination can be made by referencing to (a) type of information data in the setting information field 65 regarding all information data. When an affirmative determination is made in step 244 or step 246, the image of the disposition position of the image and/or the barcode is deleted from the background (a blank is formed) in step 248 in order to avoid overlapping with the background, and in step 250, other information including the background is displayed on a display, then the background disposition processing subroutine is terminated and the routine proceeds to step 126 shown in FIG. 4. Incidentally, as described above, the size of the background is defined and disposed in the background image layout region 43. The image within the disposition allowable region 41 shown in FIG. 15 shows a state that the background has been finally disposed, where the disposition positions of the determined prohibition region 63, the image (face photograph) and the barcode have been deleted from the background (blanks are formed).

Figure 10:
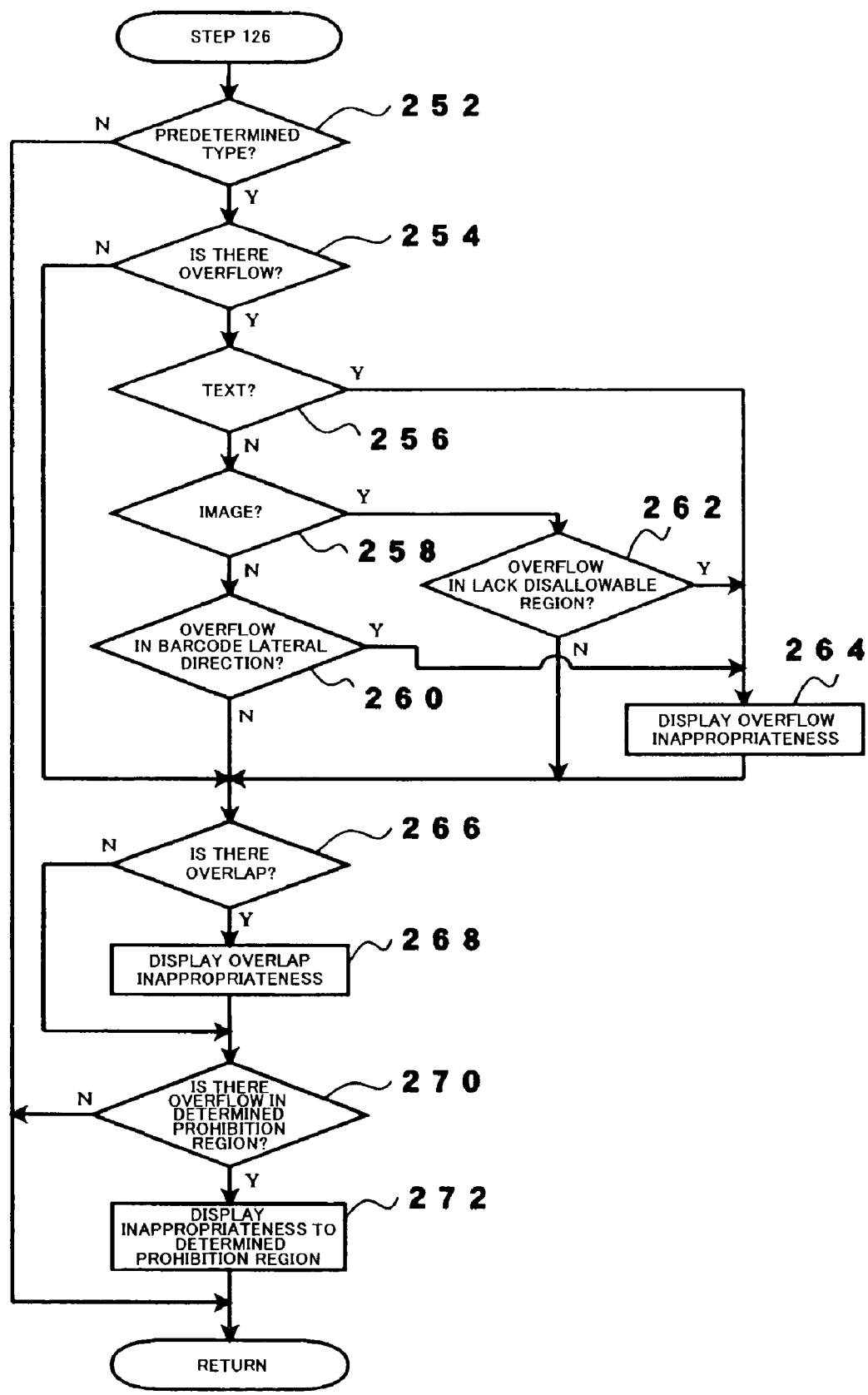
FIG. 10 is a flowchart of a determination processing subroutine showing details of step 126 of the layout processing routine.

In step 126 shown in FIG. 4, a determination processing subroutine for making a determination about overflowing from the print securing region 40 or the like on the basis of the allowable rank determined about the information data which is disposed within the disposition allowable region 41 is executed. As shown in FIG. 10, in this determination processing subroutine, a determination is made in step 252 about whether subject information data (disposed by the disposition button 60) is a predetermined type such as an image, a text, and a barcode. When the determination is negative (when it is a background or a prohibition region), the determination processing subroutine and the layout processing routine are terminated. On the other hand, when the determination is affirmative, a determination is made in step 254 about whether the subject information data is overflowing from the print securing region 40.

Figure 17A:
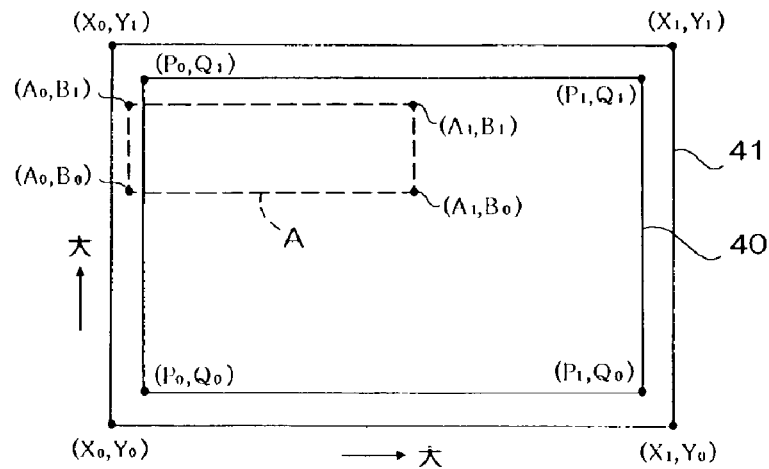
FIG. 17A is an explanatory diagram showing a determination principle about an overflow of information data from the print securing region.

As shown in FIG. 17A, when the coordinates of the disposition allowable region 41 are represented with $(X_0, Y_0)$, $(X_1, Y_0)$, $(X_1, Y_1)$ $(X_0, Y_1)$, the coordinates of the print securing region 40 are represented with $(P_0, Q_0)$, $(P_1, Q_0)$, $(P_1, Q_1)$, $(P_0, Q_1)$, and the coordinates of the disposition position of information data A are represented with $(A_0, B_0)$, $(A_1, B_0)$, $(A_1, B_1)$, $(A_0, B_1)$, a condition that information data A is overflowing horizontally from the print securing region 40 is given by the following inequality (1), and a condition that it is overflowing vertically is given by the following inequality (2).

$$P_0 \geq A_0 \text{ or } A_1 \geq P_1 \tag{1}$$

$$Q_0 \geq B_0 \text{ or } B_1 \geq Q_1 \tag{2}$$

Figure 17B:
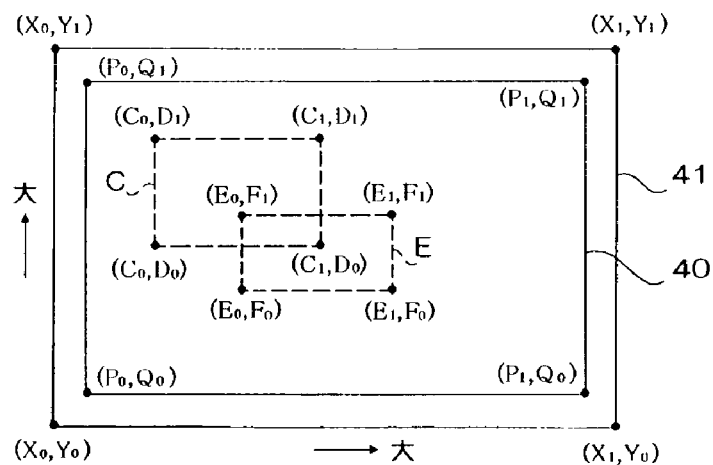
FIG. 17B is an explanatory diagram showing a determination principle about an overlap of information data.

Further, as shown in FIG. 17B, when the coordinates of the disposition position of information data C are represented with $(C_0, D_0)$, $(C_1, D_0)$, $(C_1, D_1)$, $(C_0, D_1)$ and the coordinates of the disposition position of information data E are represented with $(E_0, F_0)$, $(E_1, F_0)$, $(E_1, F_1)$, $(E_0, F_1)$, a condition that the information data E partially overlaps with the information data C is given by the following inequality (3), and a condition that the information E is completely overlapped on (included in) the information data C is given with the following inequalities (4).

$$C_0 < E_0 < C_1 \text{ and } D_0 < F_1 < D_1$$

$$(C_0 < E_0 < C_1 \text{ or } C_0 < E_1 < C_1) \tag{3}$$

and $$(D_0 < F_0 < D_1 \text{ or } D_0 < F_1 < D_1) \tag{4}$$

Accordingly, in step 254, a determination is made about whether or not the subject information data is overflowing from the print securing region 40 by judging whether or not the inequality (1) or the inequality (2) is satisfied. When a negative determination is made in step 254, the routine proceeds to step 266, and when an affirmative determination is made in step 254, a determination is made in the next step 256 about whether or not the subject information data is a text. When an affirmative determination is made, the routine proceeds to step 264, and when a negative determination is made, a determination is made in step 258 about whether or not the subject information data is an image. As described above, in case of an image, even if a portion of the image region 66 is lacking from the IC card C, unless the lack disallowable region 67 including the position of a face is lacking from the IC card C, poor printing does not occur on the IC card C, so that, when an affirmative determination is made in step 258, a determination is made according to the inequalities (1) and (2) in step 262 about whether or not the lack disallowable region 67 is also overflowing from the print securing region 40. When an affirmative determination is made in step 262, the routine proceeds to step 264, while the routine proceeds to step 266 when a negative determination is made.

On the other hand, when a negative determination is made in step 258, since the subject information data is a barcode, a determination is made according to the above-described inequality (1) in step 260 about whether the barcode is overflowing horizontally. When an affirmative determination is made, the routine proceeds to step 264, and when a negative determination is made, the routine proceeds to step 266. In step 264, since there is a possibility that the subject information data overflows from the print allowable region 40 so as to cause a lack, a message as disposition inappropriateness information that the subject information data overflows is displayed on the information displaying field 64, and the routine proceeds to step 266.

Next, in step 266, a determination is made about whether or not there is an overlap on the subject information data by judging whether or not the above inequality (4) is satisfied regarding all the information data except for the background and the determined prohibition region 63. When a negative determination is made, the routine proceeds to step 270, and when an affirmative determination is made, a message as disposition inappropriateness information that there is an overlap on the subject information data is displayed at the information displaying field 64 in the next step 268. In this case, the type and the control number of the overlapping subject information data may be displayed, too.

In the next step 270, a determination is made about whether or not the subject information data overflows to the determined prohibition region 63 (overlaps with the determined prohibition region 63) by judging whether or not the above inequality (4) is satisfied. When an affirmative determination is made, a message as disposition inappropriateness information that the subject information data overflows to (overlaps with) the determined prohibition region 63 is displayed in the next step 272, and the determination processing subroutine and the layout processing routine are terminated like the case that the negative determination is made in step 270. Incidentally, regarding the subject information data, an overflow, an overlap and an overflow to the prohibition region may be simultaneously commented. Further, unless there is an overflow, an overlap, or an overflow to the prohibition region, a comment indicating that the disposition is appropriate may be displayed at the information displaying field 64.

An operator can confirm whether or not the disposition positions about the information data are appropriate one by one according to the above-described layout processing routine. Therefore, when the disposition position of the information data is inappropriate, an appropriate layout image can be obtained by performing the disposition again. Incidentally, such a constitution or a method may be employed that, after all the information data are disposed in the disposition allowable region 41, the determination processing about all the information data is carried out in step 126. In this case, a determination may be made about whether or not the disposition of all the information data is terminated before step 126, and the routine returns to step 108 when a negative determination is made, while the routine proceeds to step 126 when an affirmative determination is made and execution of the above-described determination processing subroutine about the information data one by one may be made in step 126.

A layout image of a bitmap thus prepared where a lack does not occur is transmitted from the PC 3 to the printing apparatus 2 via the connecting cable 4. In the printing apparatus 2, the layout image received via the external input/output interface 28 and the buffer memory 29 in the control section 20 is stored in the RAM of the microcomputer 21.

Next, the CPU in the microcomputer 21 carries out color separation of the received layout image into three colors of Y, M, C, and transmits color-separated thermal intensity information representing an intensity with 256 gradations to the thermal head control section 30 for each of Y, M, C. In the image forming section 13, the thermal head 6 is heated according to the thermal intensity information transmitted from the thermal head control section 30, and images are formed in a superimposed manner on the intermediate transfer sheet F by Y, M, C dyestuff of the thermal transfer sheet R. The intermediate transfer sheet F is taken up by the intermediate transfer sheet taking-up section 17 and an image formed portion thereof is conveyed to the transfer section 10.

On the other hand, a blank IC card C is pulled out from the card supplying section 5 one by one, and is conveyed to the transfer section 10 via the horizontal conveying section 11*a*. The IC card C and the image formed portion formed on the intermediate transfer sheet F are conveyed to the transfer section 10 in a synchronized manner, then the heat roller 8 is descended, and the image formed portion of the intermediate transfer sheet F is transferred with heat of the heat generating lamp housed in the heat roller 8 (and pressure imparted by the heat roller 8) onto the surface side of the IC card C which is supported by the platen roller 9.

The IC card C on which the image has been formed is conveyed on the conveying and discharging section 11*b* in a generally horizontal direction, and is received by the stacker 12 in a stacking manner. In this way, in the printing system 1, the IC card C shown in FIG. 11 is produced.

According to the printing system 1 of the present embodiment, since each of the information data is confirmed and changed so as to enter into the print securing region 40 where printing is secured on the IC card C (a lack does not occur) in the layout processing routine (the determining processing subroutine), poor printing can be prevented before printing by the printing apparatus 2 on the IC card C is carried out. Further, since the allowable rank to the print securing region 40 can be inputted regarding an overflow and an overlap, in other words, accuracy information to the print securing region 40 can be inputted, by distinguishing in advance between information data which is allowed to overflow from the print securing region 40 and information data which is not allowed to overflow, poor printing (print cost) can be reduced and a degree of freedom for printing can be secured.

Further, in the printing system 1 of the present embodiment, since the print securing region 40 is set based upon the maximum error values inherent to the printing apparatus 2, by forming an layout image, an IC card C without poor printing (without a lack) can be produced securely. Furthermore, in the printing system 1, since the decision prohibition region 63 is defined according to the maximum error values, the area of the prohibition region can be minimized and a functional defect in the IC card C having the contacts 31 can be prevented. While in a printing system which does not depend on the maximum error values of a printing apparatus, if a print securing region is set uniformly, the print securing region must be reduced in order to reduce poor printing. In contrast, in the printing system 1 of the present embodiment, since the print securing region 40 is set to have the safety margin within the real size of the IC card C depending upon the maximum error values and the print securing region 40 is changed for setting according to the maximum error values, a region where printing is secured can be obtained widely. Moreover, in the printing system 1, since the image region 66 where a lack to an image is allowed to occur and the lack disallowable region 67 are provided, and the determination about appropriateness is made to both the image region 66 and the lack disallowable region 67, and further an overflow is allowed to one of vertical horizontal directions of a barcode while another is prohibited from overflowing. Accordingly, the degree of freedom of the layout to the disposition allowable region 41 can be enhanced.

Incidentally, in the present embodiment, the example where the print securing region 40 is set to have the safety margin within the real size of the IC card C based upon the maximum error values was shown. However, such a constitution may be employed that the print securing region 40 is set in advance to be slightly smaller than the IC card C, and a determination is made about whether or not a lack occurs in the print securing region 40 according to a position deviation due to the maximum error values. When it is determined that no lack occurs, the print securing region is set, while the print securing region is narrowed only in a direction in which a lack occurs when it is determined that a lack occurs. By employing such a constitution, the print securing region may be secured widely without causing a lack. Further, in the present embodiment, the maximum error values that are set to a safety side on the basis of the statistic distribution of print position errors of printing apparatuses of the same type as the position error information was exemplified. However, the present invention is not limited to this example, and, for example, the maximum error values at a time of complete test of the printing apparatus 2 may be used as the position error information. Furthermore, in case that the maximum error values are changed due to repair and the like of the printing apparatus 2, or in case that, there is no problem to set the maximum error values to be smaller since the position error inherent to the printing apparatus 2 is known experientially, the maximum error values stored in the EPROM 22 may be rewritten by operating the touch panel 38.

Figure 18:
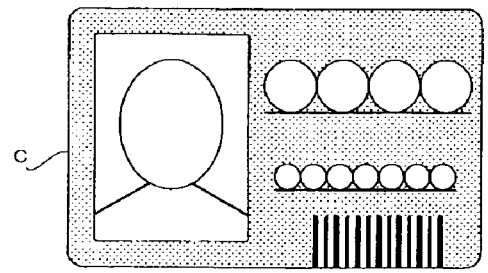
FIG. 18 is a plan view showing another example of an IC card on which printing is carried out by the printing apparatus.
Figure 19:
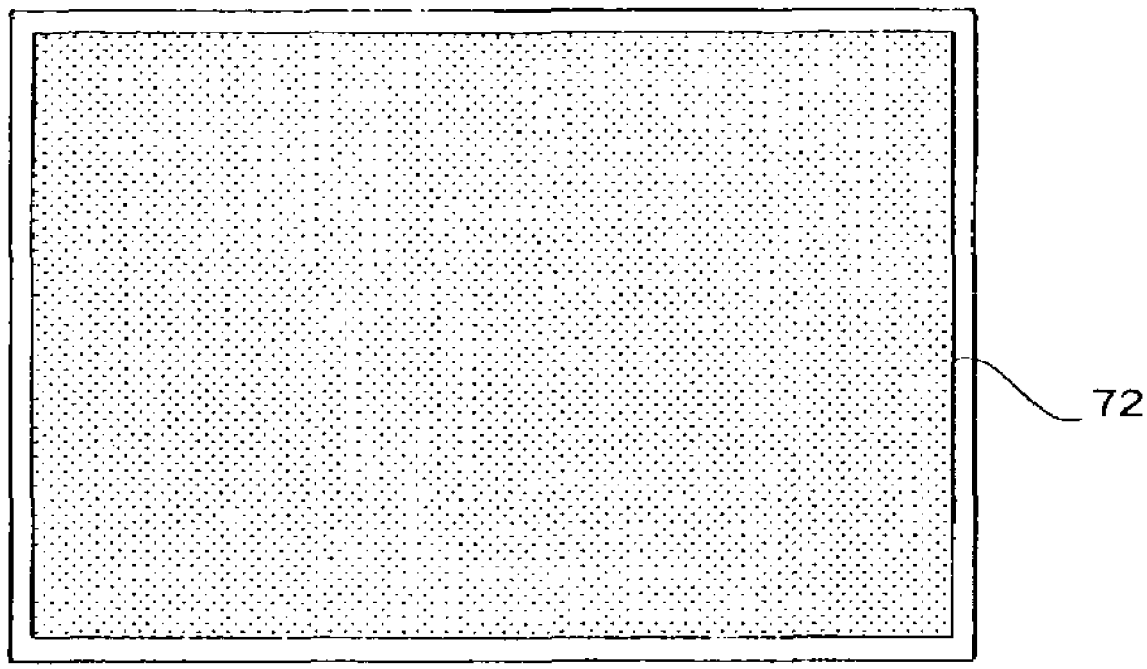
FIG. 19 is an explanatory diagram of a conventional layout method for performing layout of an image to be printed on a recording medium.

Moreover, in the present embodiment, the IC card C having the contacts 31 was exemplified, however, it goes without saying that the present invention may be applied to a case in producing a recording medium which does not have contacts as shown in FIG. 18, such as an IC card, a credit card, a cash card, a license card or the like. Further, in the present invention, the example where one background image is provided was shown, however, the number of background images is not limited to one and a plurality of background images may be used. By disposing a plurality of background images, the security of the recording medium can be enhanced.

Furthermore, in the present embodiment, the example that the PC3 receives the maximum error values from the printing apparatus 2 and produces the layout image, and then the disposition position of the information data is determined at the side of the PC 3 was shown. However, such a constitution may be employed that an layout image is produced at the side of the PC 3 to be fed to the side of the printing apparatus 2, and at the side of the printing apparatus 2, by setting the print securing region 40, a determination is made about whether or not information data on the layout image is overflowing from the print securing region 40, a determination is made about whether or not the information data overlaps with each other, and a determination is made about whether or not the information data is overflowing in the decision prohibition region 63, and then the determination results are fed to the PC 3. In this case, it is unnecessary to receive the information data itself at the side of the printing apparatus 2. That is, in accordance with the explanation along the above-described embodiment, the print securing region 40 may be calculated from the maximum error values inherent to itself by receiving the setting information in the setting information field 65 about the information data, and appropriateness of the disposition position of each information data may be determined according to the above inequalities (1) to (4) without developing an image of the information data. By employing such a constitution, a time required for the determinations can be shortened since a time for developing the image of the information data is not required. Further, in the above-described embodiment, the example that (d) operator's setting allowable rank to a lack and (f) operator's setting allowable rank to an overlap in the setting information field 65 are inputted was shown. However, in case that a determination is made at the side of the printing apparatus 2, inputting of such setting allowable ranks may be omitted, or may be carried out by using the touch panel 38.

Further, such a constitution may be employed that the printing apparatus 2 receives the information data and the attribute information of the information data in the setting information field 65 from the side of the PC 3, the print securing region 40 is calculated from the maximum error values inherent to itself, then the image of the information data is developed according to the above-described inequalities (1) to (4), and when there is an overflow, an overlap or an overflow into the determined prohibition region, the position of the information data corresponding thereto is changed so as to avoid the overflow, the overlap, or the overflow into the determined prohibition region. For example, in case of the information data A shown in FIG. 17(A), the overflow can be cancelled by moving the information data A only horizontally so as to be disposed inside of the print securing region 40. As a result, if the information data A causes an overlap with other information data (the determination can be made according to the above inequity (4)), moving to the minimum movement direction that can avoid of the overlap may be carried out. Furthermore, when there is an overflow, an overlap, or an overflow into the determined prohibition region, such a constitution may be employed that disposing the information data in the disposition allowable region is made impossible; the information data returns to the position of the original button even if an operator tries to dispose the information; the information data can be disposed once but it returns to the position of the original button at a time of determination after the disposition is finished (e.g., after a return key is pressed); or printing of a layout image is made impossible. Moreover, regarding an image of information data where a lack is not allowed, the disposition position of the image and moving position for drugging or the like may be limited such that the image can not be disposed within a region other than the print securing region 40, or an alarm may be displayed in the information displaying field 64 at a time of dropping.

A program as described above may be recorded on a computer readable recording medium such as, for example, a floppy disk, an MO, a ZIP or the like, and may be installed in the printing apparatus 2 or the PC 3.

What is claimed is:

1. A printing control system that has a main body apparatus for producing information data and a printing apparatus for printing the information data on a recording medium, and that controls printing processing of the information data, comprising:

a setting unit which sets attribute information inherent to the information data;

a layout unit which sets disposition of the information data to the recording medium in order to print the information data on the recording medium;

a determining unit which determines about whether disposition of the information data to the recording medium is appropriate based upon disposition position information of the information data to be positioned by the layout unit and the attribute information set by the setting unit; and a control unit which controls printing processing of the information data on the basis of a determination result obtained by the determining unit, wherein the attribute information inherent to the information data set by the setting unit is constituted with at least one of lack allowance rank information expressing an allowance degree to a lack which occurs at least at a portion of the information data due to that the information data overflows from the recording medium, overlap allowable rank information expressing an allowance degree to an overlap of the information data on different other information data, and printing prohibition region setting information expressing a printing prohibition region for prohibiting printing processing, at a time of printing processing to the recording medium.

2. A printing control system according to claim 1, further comprising an information displaying unit which displays the determination result obtained by the determining unit, wherein the control unit allows printing processing of the information data when a determination by the determining unit is made that the disposition of the information data to the recording medium is appropriate, and allows the information displaying unit to display disposition inappropriateness information of the information data when a determination by the determining unit is made that the disposition of the information data to the recording medium is inappropriate.

3. A printing control system according to claim 2, wherein the attribute information includes lack allowance rank information expressing an allowance degree to a lack which occurs at least at a portion of the information data due to that the information data overflows from the recording medium at a time of printing processing to the recording medium conducted by the printing apparatus, and in case that rank information which does not allow the lack is set in the information data by the setting unit, when the disposition position of the information data positioned by the layout unit is disposed at a position where the lack occurs in the information data to the recording medium, the determining unit determines that the disposition of the information data is inappropriate.

4. A printing control system according to claim 2, wherein the attribute information includes overlap allowance rank information expressing an allowance degree to an overlap of the information data with different other information data at a time of printing processing to the recording medium conducted by the printing apparatus, and in case that rank information which does not allow the overlap is set in the information data by the setting unit, when the disposition position of the information data positioned by the layout unit overlaps with a position of the different other information data, the determining unit determines that the disposition of the information data is inappropriate.

5. A printing control system according to claim 2, wherein the attribute information includes printing prohibition region setting information expressing a printing prohibition region for prohibiting printing processing at a time of printing processing to the recording medium conducted by the printing apparatus, and in case that the printing prohibition region setting information is set by the setting unit, when the disposition position of the information data positioned by the layout unit is located within the printing prohibition region, the determining unit determines that the disposition of the information data is inappropriate.

6. A printing control system that has a main body apparatus for producing information data and a printing apparatus for printing the information data on a recording medium, and that controls printing processing of the information data, comprising:
a position control data holding unit that sets position control data in advance, which express an inherent printing position deviation amount based on maximum error values for the printing apparatus derived when the printing apparatus prints the information data on the recording medium;
a layout unit which sets disposition of the information data to the recording medium in order to print the information data on the recording medium;
a determining unit which compares disposition position information of the information data to be positioned by the layout unit and the position control data held by the position control data holding unit to determine about whether the disposition of the information data to the recording medium is appropriate; and
a control unit which controls printing processing of the information data on the basis of a determination result obtained by the determining unit.

7. A printing control system according to claim 6, further comprising an information displaying unit which displays the determination result obtained by the determining unit, wherein the control unit allows printing processing of the information data when a determination by the determining unit is made that the disposition of the information data to the recording medium is appropriate, and allows the information displaying unit to display disposition inappropriateness information of the information data when a determination by the determining unit is made that the disposition of the information data to the recording medium is inappropriate.

8. A printing control method that controls printing of at least one or more information data to a recording medium, comprising:
a step of setting attribute information inherent to the information data;
a step of setting disposition of the information data to the recording medium in order to print the information data on the recording medium;
a step of determining about whether disposition of the information data to the recording medium is appropriate based upon disposition position information of the information data and the attribute information; and
a step of controlling printing processing of the information data so as to allow the printing processing when a determination in the determining step is made that the disposition of the information data to the recording medium is appropriate, and so as to prohibit the printing processing when a determination in the determining step is made that the disposition of the information data to the recording medium is inappropriate,
wherein the attribute information inherent to the information data set in the setting step is constituted with at least one of lack allowance rank information expressing an allowance degree to a lack which occurs at least at a portion of the information data due to that the information data overflows from the recording medium, overlap allowable rank information expressing an allowance degree to an overlap of the information data on different other information data, and printing prohibition region setting information expressing a printing prohibition region for prohibiting printing processing, at a time of printing processing to the recording medium.

9. A printing control method according to claim 8, wherein in the controlling step the printing processing is controlled so as to limit movement of the disposition position of the information data when a determination in the determining step is made that the disposition of the information data to the recording medium is appropriate.

10. A printing control method according to claim 8, wherein in the controlling step the printing processing is controlled so as to adjust the disposition position of the information data when a determination in the determining step is made that the disposition of the information data to the recording medium is inappropriate.

11. A computer readable medium encoded with a program for information layout that performs layout of information data to a recording medium, which causes a computer to realize acts of:

inputting the information data;

setting attribute information inherent to the inputted information data;

setting disposition of the information data to the recording medium;

determining about whether disposition of the information data to the recording medium is appropriate based upon set disposition position information of the information data and the set attribute information of the information data; and allowing to display disposition inappropriateness information of the information data when a determination by the determining function is made that the disposition of the information data to the recording medium is inappropriate, wherein the attribute information inherent to the inputted information data is constituted with at least one of lack allowance rank information expressing an allowance degree to a lack which occurs at least at a portion of the information data due to that the information data overflows from the recording medium, overlap allowable rank information expressing an allowance degree to an overlap of the information data on different other information data, and printing prohibition region setting information expressing a printing prohibition region for prohibiting printing processing, at a time of printing processing to the recording medium.

12. A computer readable medium encoded with a program for information layout according to claim 11, that further causes the computer to realize an act of limiting the disposition position of the information data when a determination by the determining function is made that the disposition of the information data to the recording medium is inappropriate.

13. A computer readable medium encoded with a program for information layout according to claim 11, that further causes the computer to realize an act of adjusting the disposition position of the information data when a determination by the determining function is made that the disposition of the information data to the recording medium is inappropriate.

* * * * *